United States Patent [19]

Fortino et al.

[11] Patent Number: 5,421,000
[45] Date of Patent: May 30, 1995

[54] MEMORY SUBSYSTEM HAVING A STATIC ROW MEMORY AND A DYNAMIC RAM

[75] Inventors: Ronald N. Fortino; Harry I. Linzer; Kim E. O'Donnell, all of Raleigh, N.C.

[73] Assignee: International Business Machines Corp., Armonk, N.Y.

[21] Appl. No.: 97,931

[22] Filed: Jul. 26, 1993

Related U.S. Application Data

[63] Continuation of Ser. No. 668,672, Oct. 4, 1990, abandoned, which is a continuation of Ser. No. 342,833, Apr. 25, 1989, abandoned.

[51] Int. Cl.$^6$ ............................................. G06F 12/00
[52] U.S. Cl. .................................. 395/425; 395/275; 364/243.6; 364/243.41; 364/DIG. 1; 365/189.01
[58] Field of Search ................ 395/275, 425; 365/189; 364/200, 900

[56] References Cited

U.S. PATENT DOCUMENTS

| | | | |
|---|---|---|---|
| 4,249,247 | 2/1981 | Patel | 364/900 |
| 4,316,244 | 2/1982 | Grondalski | 364/200 |
| 4,608,666 | 8/1986 | Uchida | 365/189.01 |
| 4,615,017 | 9/1986 | Finlay et al. | 364/900 |
| 4,616,310 | 10/1986 | Dill et al. | 364/200 |
| 4,682,284 | 7/1987 | Schrofer | 364/200 |
| 4,691,289 | 9/1987 | Thaden et al. | 364/518 |
| 4,701,843 | 10/1987 | Cohen | 364/200 |
| 4,713,756 | 12/1987 | Mackiewicz et al. | 364/200 |
| 4,719,602 | 1/1988 | Hag et al. | 365/230 |
| 4,725,945 | 2/1988 | Kronstadt et al. | 364/200 |
| 4,731,758 | 3/1988 | Lam et al. | 365/189 |
| 4,755,964 | 7/1988 | Miner | 364/900 |
| 4,758,992 | 7/1988 | Taguchi | 365/201 |
| 4,779,232 | 10/1988 | Fukunaka et al. | 365/189 |
| 4,797,850 | 1/1989 | Amitai | 364/900 |
| 4,800,535 | 1/1989 | McAlpine | 364/200 |
| 4,802,135 | 1/1989 | Shinoda et al. | 365/233 |
| 4,817,054 | 3/1989 | Banerjee et al. | 365/189 |
| 4,829,471 | 5/1989 | Banerjee et al. | 364/900 |
| 4,839,796 | 6/1989 | Rorden et al. | 364/200 |
| 4,839,856 | 1/1989 | Tanka | 364/900 |
| 4,894,770 | 1/1990 | Ward et al. | 364/200 |
| 4,901,282 | 2/1990 | Kobayashi | 365/222 |
| 4,937,791 | 1/1990 | Steele et al. | 365/230.03 |
| 5,226,147 | 7/1993 | Fujishima et al. | 395/425 |

FOREIGN PATENT DOCUMENTS 0173981 3/1986 European Pat. Off. .

*Primary Examiner*—Christopher B. Shin
*Attorney, Agent, or Firm*—J. G. Cockburn

[57] ABSTRACT

A computer memory subsystem is comprised of one or more Dynamic Random Access Memory (DRAM) arrays with on-chip sense latches for storing data outputted from the DRAM, an on-chip Static Random Access Memory (SRAM) functioning as a Distributed Cache and an on-chip multiplexor. A first data bus interconnects the sense latches, the SRAM and the multiplexor. A second data bus interconnects the multiplexor and the SRAM. A memory controller generates signals which cause information to be extracted from the DRAM while the contents of the SRAM is unchanged or vice versa.

1 Claim, 7 Drawing Sheets

MEMORY SUBSYSTEM HAVING A STATIC ROW MEMORY AND A DYNAMIC RAM

This application is a continuation of Ser. No. 07/668,672, filed Oct. 4, 1990, abandoned, which is a continuation of Ser. No. 07/342,833, filed Apr. 25, 1989, abandoned.

BACKGROUND OF THE INVENTION

1. Field of the Invention

The invention relates to computer memory systems in general and more particularly to high speed semiconductor memories.

2. Prior Art

The designers of all forms and classes of computer systems have commonly expressed the desire to provide higher speed systems at relatively low cost. A typical computer system has at least one central processing unit (CPU) which is connected to a memory subsystem over a system bus. If designers are going to be successful in meeting a satisfactory speed/cost goal, improvements are required not only in the CPU section of the computer systems but also in the memory sub-system.

Computer memories can be broadly classified into three classes, namely: dynamic random access memory (DRAM), static random access memory (SRAM) and hybrid memory. Even though the three types of memories are fabricated from semiconductor devices, there are certain advantages and disadvantages associated with each type. Therefore, if one wishes to provide an optimum memory assembly, one has to overcome the disadvantages that are associated with a particular type of memory.

DRAMs have been widely used in the computer industry. This type of memory is attractive because of its high density and low power consumption. Because of the high density and low power consumption, DRAMs are low cost memories which are used whenever large memory capacity is required. The drawback with this type of memory is that the stored data volatilizes in a relatively short time period, if not refreshed. Therefore, the DRAM must be refreshed at given time intervals (usually every 2 m secs). The refreshing procedure requires a circuit which generates a refresh or an address request signal for refreshing a selected memory zone and a refresh control signal to control the cycle timing of the read and write operation of data with the refreshing operation. In addition, a multiplexor for selecting either an address for refreshing or an address for a read and write operation within the cycle timing may also be required.

On the other hand, the SRAM is lower density and consumes a relatively large amount of power. As a result, it is usually expensive and is used for relatively small capacity memories. In spite of its drawback, the SRAM requires no refreshing cycle and thus no additional refresh circuitry is required. In addition, the SRAM is an inherently faster device than the DRAM.

In an attempt to circumvent the above-described shortcomings and at the same time provide a memory system with acceptable speed/cost characteristics, the prior art has developed hybrid memory systems. A typical hybrid memory system consists of a combination of DRAMs, SRAMs and memory controllers. In the hybrid configuration the SRAM functions as a distributed cache memory which is fabricated on the DRAM module or on a separate module.

An example of a prior art hybrid memory is disclosed in U.S. Pat. No. 4,725,945 issued to Kronstadt et al. FIG. 1, of this patent, discloses a prior art microcomputer system in which an instruction and/or data cache is fabricated on the CPU side of the system bus. The cache is a separate SRAM module interconnected via the bus to the DRAMs. The control logic associated with the cache attempts to maximize the number of accesses (called hits) to the cache and minimizes the number of accesses to the DRAMs. Because the access time for the cache is much shorter than the access time for the DRAMs, system throughput can be increased if the instruction and/or data to be used in a particular operation is in the cache rather than in the DRAM. One of the problems associated with the displaced or separate storage cache is that a relatively large number of pins are needed on the SRAM module and the DRAMs for interconnection purposes.

FIGS. 2-6 of the Kronstadt et al patent disclose a hybrid memory which is an improvement over the memory of FIG. 1. The improved hybrid memory includes a plurality of memory banks. Each bank consists of an array of DRAMs and an on-chip SRAM buffer for storing an entire row of DRAM data. A memory controller receives real addresses on the memory bus and extracts bank and row numbers from the address. The memory controller determines whether the access row for a memory bank is in the distributed cache for the bank. Even though this system works well for its intended purpose, it has one drawback in that if a "miss" occurs the contents of the cache are replaced with the data which is read out from the DRAMs. A "miss" occurs if a requested piece of information is not present in the cache. Replacing the contents of the cache on the occurrence of a miss tends to reduce system throughput. This adverse effect is more pronounced in systems where instructions and data are stored in the same memory. Usually, several instructions are stored in the cache buffer and are used repeatedly albeit with different data. Because the design requires replacing the data whenever a "miss" occurs, instructions which are used repeatedly are often destroyed and have to be replaced from the DRAM array. This negates the benefits that the SRAM usually provides.

Another type of prior art hybrid memory is the Video RAM. In the video RAM a serial read (SRAM) register has been added to a DRAM array. Once loaded, this register can be accessed through its serial read port. This type of memory is not well suited for use as computer memories because data can only be extracted serially from the SRAM. An example of the prior art video RAM is set forth in U.S. Pat. No. 4,731,758 to Heng-Mun Lam et al.

Still other types of hybrid memories with complicated structures are set forth in U.S. Pat. Nos. 4,417,318, 4,589,067, 4,608,666 and 4,758,987. Probably, the least attractive features of these memories are their complex structures.

SUMMARY OF THE INVENTION

It is therefore an object of the present invention to provide a more efficient memory system than has heretofore been possible.

The object of the present invention is attained by providing Distributed Cache DRAMs (DC DRAMs) whose on-chip SRAM buffer is accessed randomly, with data selected using the RAM address lines. The SRAM buffer is sized to store a row of the DRAM array. The buffer is used to implement a parallel load cache that is used predominantly for Instruction Fetches which tend to be located within a contiguous sector of memory and account for more than 50% of the storage bandwidth of modern microprocessor architecture.

More particularly, the improved memory system includes one or more DRAM arrays with on-chip sense logic and an on-chip SRAM buffer equal in size to a single row of the dynamic RAM cells and an on-chip multiplexor (MUX). A first bus interconnects the sense logic, the SRAM buffer and the MUX. A second bus interconnects the SRAM buffer and the MUX. A Distributed Cache DRAM (DC DRAM) controller receives real addresses on the memory bus and extracts rows and column addresses which are used to retrieve information from the SRAM buffer or the DRAM array. Information in the DRAM array can be accessed (read out) without erasing information in the SRAM buffer and vice versa.

Because of the DC DRAM controller and the novel structure of the DC DRAM instructions and/or frequently used data may be transferred from the DRAM array into the SRAM buffer. When the processor demands data and an instruction, the DC DRAM controller fetches the instruction from the SRAM buffer and data from the DRAM array. Because the SRAM cycle is much shorter than the DRAM cycle, the overall performance (i.e., access cycle time) of the memory system is significantly improved. The improvement is even better if the data and instruction resides in the SRAM buffer.

DETAILED DESCRIPTION OF THE INVENTION

According to the invention, a novel memory system called a Distributed Cache system uses one or more arrays of distributed cache DRAM (DC DRAM) and a DC DRAM controller to build a memory sub-system which provides a rapid access copy of one page of storage. If desired, the page of storage need not be disturbed by random access to other storage pages. The page of storage may typically range in size from 256 to 8192 bytes of storage depending on the exact configuration of the memory sub-system. The DC DRAM (to be described hereinafter) is a chip having one or more arrays of dynamic RAMs or other dynamic storage means and a static RAM (SRAM) buffer or other static storage means which is equal in size to one row of the DRAM arrays. The SRAM buffer is used for storing the page of memory. As is used in this document, a dynamic storage is one that has to be refreshed periodically. Likewise, a static storage is one that does not have to be refreshed.

Figure 1:
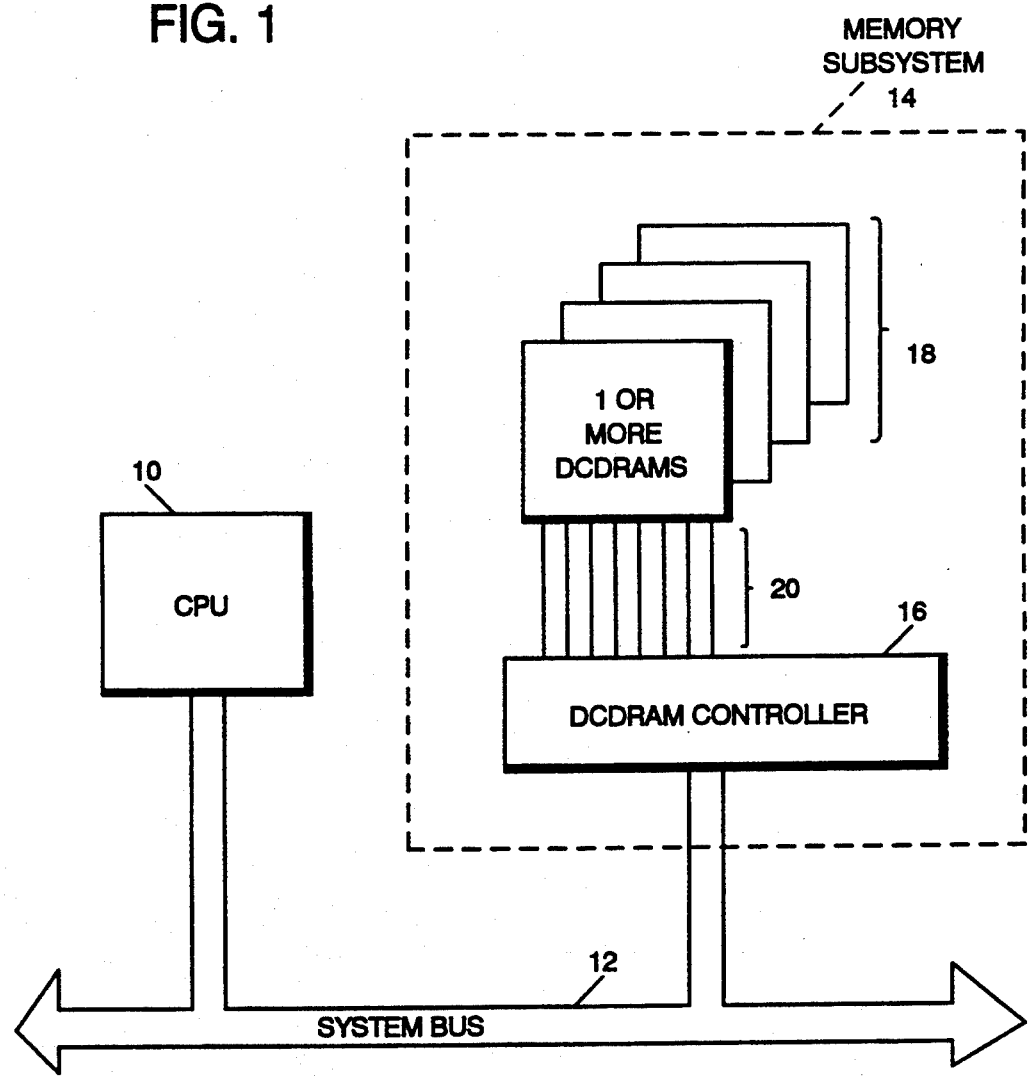
FIG. 1 shows a block diagram of a generic CPU and a memory sub-system according to the teachings of the present invention.

FIG. 1 shows a computer system which embodies a memory sub-system according to the teachings of the present invention. The computer system includes a central processing unit (CPU) 10, system bus 12 and memory sub-system 14. As will be explained subsequently, the memory sub-system 14 stores data which the CPU can retrieve by issuing address information and appropriate command signals on system bus 12. The memory sub-system 14 includes DC DRAM controller 16 and one or more DC DRAMs. The DC DRAM controller 16 is connected by conductors 20 to the DC DRAMs 18. The number of DRAMs 18 depends on the size of the memory that one wishes to create. For example, if one wishes to build an eighteen bit wide memory system using 1 megabit DC DRAMs, one would need 18 DC DRAMs, 2 megabytes memory and the row size would be 2048 bytes. The memory system is a typical configuration for a personal computer.

Figure 2:
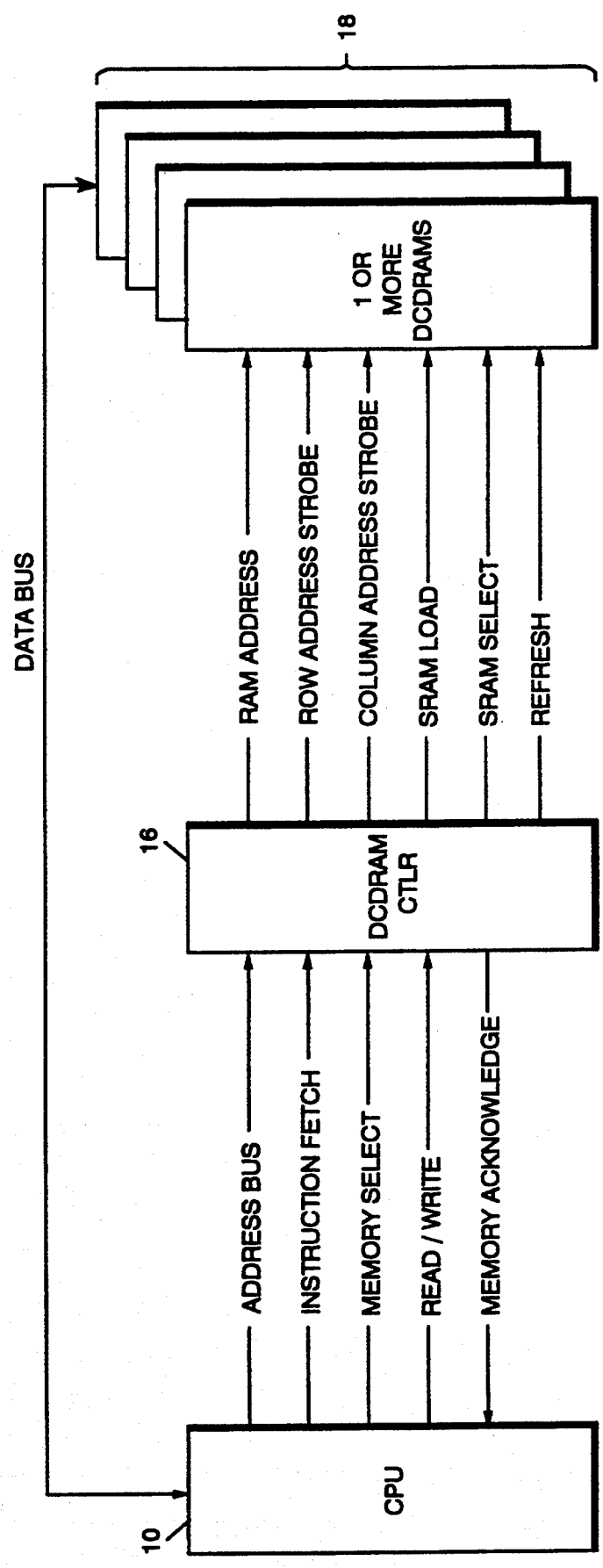
FIG. 2 shows the control lines that interconnect the CPU, Distributed Cache DRAM controller (DC DRAM CTLR) and memory modules (DC DRAMs).

FIG. 2 shows a typical interconnection between CPU 10, DC DRAM controller 16 and the one or more DC DRAMs 18. In a typical application one controller controls several DC DRAMs connected to form a desired size memory. The interconnection between the DRAMs is within the skill of the art. Therefore, only the control lines which are necessary to implement the present invention will be described. The interconnection between CPU 10 and the DC DRAM controller 16 includes an address bus, an Instruction Fetch line, a memory select line, a read/write line, and a memory acknowledge line. Each of the enunciated lines carries signal pulses which are necessary for the operation of the memory subsystem. The arrow on each line indicates the direction of signal flow. The memory acknowledge line carries acknowledgment signals from controller 16 to CPU 10. All other enunciated lines carry signals and other information from the CPU to the DC controller 16.

The DC DRAM controller 16 processes the signals which are received from the CPU over the respective lines and generates other control signals which are placed on the RAM address bus, the ROW address strobe line, the Column Address Strobe Line, the SRAM load line, the SRAM select line and the refresh line. The signals which are provided on each of these lines and the function which they provide will be described subsequently. Suffice it to say at this point that the signals which are generated by the DC DRAM controller 16 on the respectively named lines are necessary to select data from the DC DRAM. As is used throughout this document, DC DRAM means the SRAM buffer and the DRAM.

Figure 3:
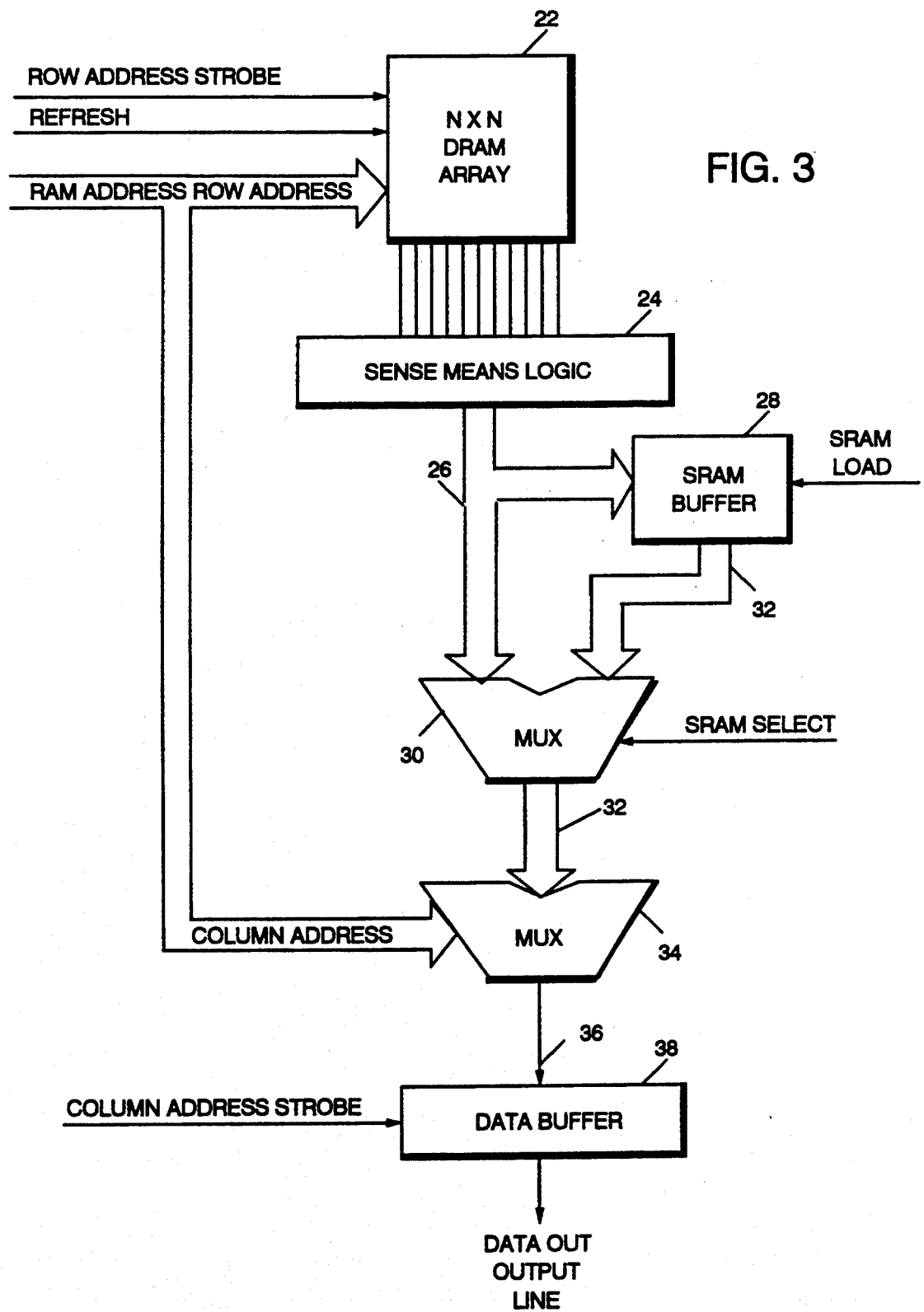
FIG. 3 is a block diagram showing the structure of the DC DRAM chip according to the present invention.

FIG. 3 is a block diagram of the DC DRAM according to the teachings of the present invention. The memory structure includes N times N DRAM array 22 and sense logic means 24. As stated above, N is the size of the array and the value of N depends on the size memory that is being constructed. A typical value for N would be 512, 1024, or 2048. The DRAM arrays are conventional arrays which are used for storing data. The sense logic means 24 is interconnected to the DRAM arrays with conventional interconnection. As with conventional DRAM arrays, sense logic means 24 stores and processes signals which are required to be read out of the DRAM arrays or signals which are read out and then write back in for refresh purposes.

Still referring to FIG. 3, the output of sense logic means 24 is connected over bus 26 to SRAM buffer 28 and multiplexor (MUX) 30. An independent Bus 32 interconnects SRAM buffer 28 to MUX 30. The SRAM buffer 28 is sized so that it can store a row of data from the DRAM arrays. As will be explained subsequently, an entire memory row from the DRAM arrays can be loaded into the static RAM buffer 28. The output of sense logic means 24 and buffer 28 is connected over different buses to bypass multiplexor 30. The size of the bypass multiplexor 30 is equivalent to the row size. This means that MUX 30 can select a row of data from the DRAM arrays or a row of data from SRAM buffer 28. By activating the SRAM Select signal, data from the SRAM buffer is conveyed over bus 32 into Column Select Multiplexor 34. Similarly, if the SRAM select signal is not activated, data from the Sense Logic Means 24 is conveyed over bus 32 to the Column Select Multiplexor 34. Column Select MUX 34 selects n (or more) of the N bits being outputted from the bypass multiplexor and passes it to the data buffers.

In an alternate embodiment, SRAM buffer 28 is sized so that it stores multiple rows of DRAM data. In this embodiment a state of the art selection circuitry is provided to identify which SRAM row to read or write.

The output from MUX 34 is fed over conductor 36 into data buffer 38. The output from data buffer 38 is fed onto the data output line and is available to the microprocessor. The MUX 34 is activated by signals on the Column Address Bus. Similarly, the Data Buffer 38 is activated by the Column Address Strobe signal.

Still referring to FIG. 3, access to the enunciated components of the distributed cache structure is controlled by control signals which are generated by the DC DRAM controller. Details of the DC DRAM controller will be described hereinafter. Suffice it to say at this point that the DC DRAM controller accepts a real address which is outputted on the system bus by the CPU and generates therefrom a RAM address which has a row address component and a column address component. The row address component together with Row Address Strobe signals, on the row address strobe line are used to access a row of data in DRAM array 22. If the Refresh Signal is activated, a refresh cycle is performed. Similarly, the column address component is used for selecting a desired bit within MUX 34. As can be seen, the bit which is selected in MUX 34 is fed over conductor 36 into data buffer Likewise, when the SRAM Load signal is asserted on the SRAM load line, the entire contents of the DRAM array row currently being held in Sense Logic Means 24 is transferred to the SRAM buffer for later use. This allows a parallel load of the static RAM buffer during any normal read of the DRAM array with 0 or minimal extra time added to the memory cycle. Similarly, if the SRAM Select signal is asserted on the SRAM select line, the output from the SRAM buffer is fed over bus 32 into MUX 30. Similarly, if the SRAM Select signal is not asserted on the SRAM signal line, then the output from Sense Logic Means 24 is fed over bus 32 into MUX 34. In the preferred embodiment of this invention the enunciated signals on the named signal lines are active when they are in a negative (−) state. It should be noted that other forms of signal convention may be used without departing from the scope or spirit of the present invention.

Figure 4:
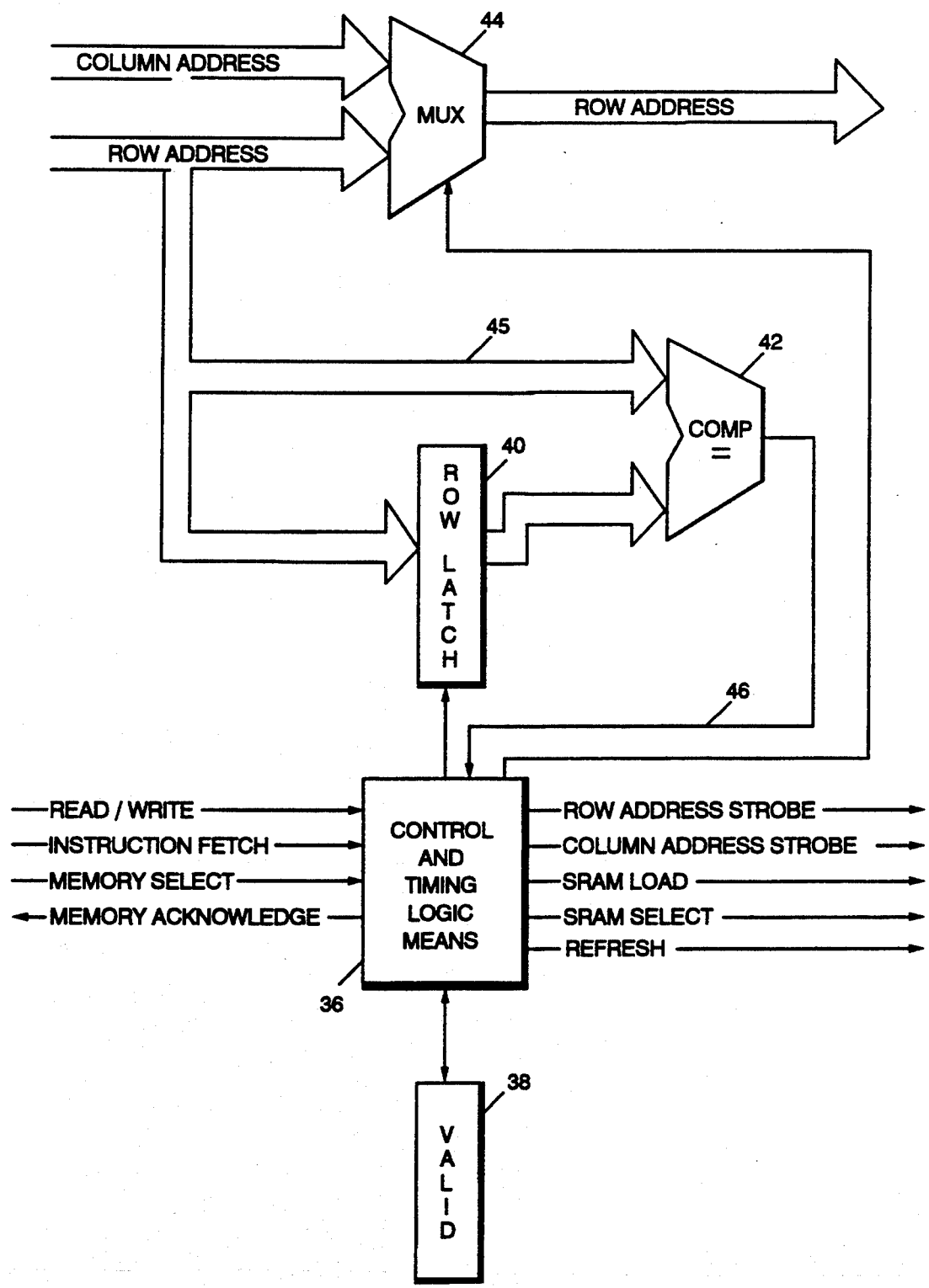
FIG. 4 shows a detail block diagram of the DC DRAM controller.

FIG. 4 shows a block diagram of the DC DRAM controller. The DC DRAM controller provides management for the DC DRAM arrays. The DC DRAM controller includes Control and Timing Logic Means 36, Valid Latch 38, Row Latch 40, comparator 42, and Row/Column Address Selector MUX 44. The circuit means 44 combines the column address and row address to generate the RAM address which is used as a row and column address internally within the DC DRAM depending on whether Column or Row Address Strobe signals are asserted. The Row Latch 40 is connected on its input side to the Row Address Bus and on its output side to Comparator 42 over bus 45. The Row Latch 40 latches the row portion of a storage address for later use. The Row Latch contains the row portion of the address of the data stored in the SRAM (FIG. 3). As will be explained subsequently, when the row portion of the address on the bus matches, i.e., compares with the information stored in the row latch, a signal is outputted on conductor 46, and the information is selected from the contents of the SRAM. The Valid Latch indicates whether or not the data in the SRAM is valid. This latch is normally reset when the system is powered up and after "Writes" into the row contained in the SRAM. The Control and Timing Logic Means generates the necessary control signals which are needed for controlling the various components of the Distributive Cache Memory System. The signals which are generated are shown in FIG. 4 and have been named and described previously.

Figure 5:
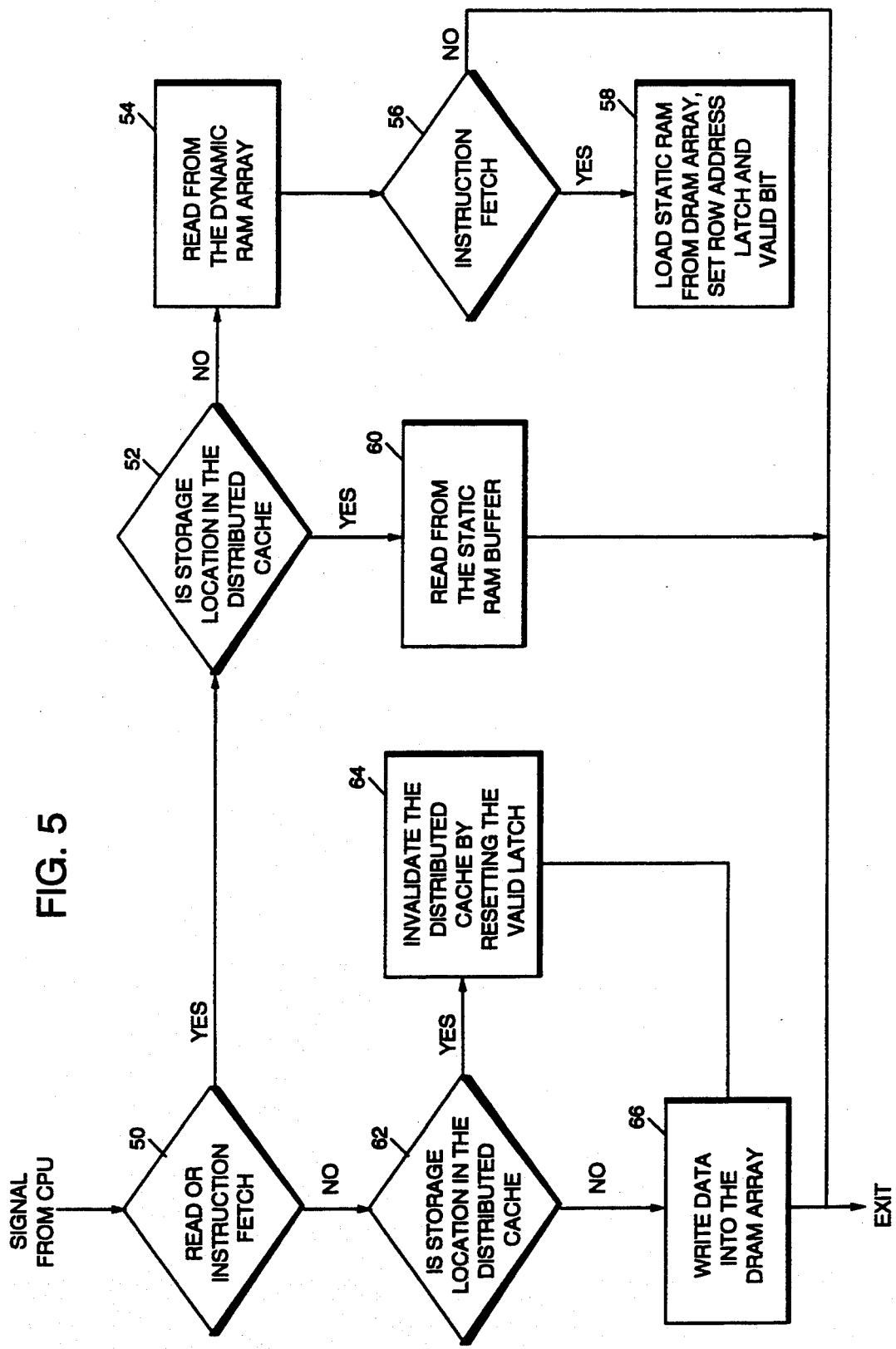
FIG. 5 shows a flow chart of the decision process for the DC DRAM controller.

FIG. 5 shows a flow chart for the logic in the control and timing logic means 36 (FIG. 4). The Logic may be implemented as a conventional clock synchronized finite state machine whose method of design from the given flow chart is within the skill of one skilled in the present art. Signals from the CPU are inputted into decisional block 50. Decisional block 50 decides if the signal is a Read or Instruction Fetch. If the signal is either a Read or Instruction Fetch, the control logic branches to decisional block 52. In decisional block 52 the logic checks to see if the selected storage location is in the Distributed Cache or SRAM. If the selected storage location is not in the Distributed Cache, the control logic enters function block 54. In functional block 54 the logic reads the data from the Dynamic RAM array. The logic then descends into decisional block 56. In decisional block 56 the logic checks to see if it is an Instruction Fetch. If it is not an Instruction Fetch, the logic exits the routine. If it is an Instruction Fetch, the logic descends into functional block 58. In functional block 58 the logic loads the Static RAM (Distributed Cache) from the DRAM arrayset, sets the Row Address Latch, sets the Valid Bit and then exits the routine.

Still referring to FIG. 5, if in decisional block 52 the storage location is found in the Distributed Cache, the logic descends into functional block 60. In functional block 60 the logic reads the information from the Static RAM Buffer and exits the routine.

Still referring to FIG. 5, and in particular block 50, if the signal from the CPU was not a Read or Instruction Fetch, the logic descends into decisional block 62. In decisional block 62 the logic checks to see if the storage location is in the Distributive Cache. If it is, the logic enters functional block 64. In functional block 64 the logic invalidates the distributive cache data by resetting the Valid Bit in the Valid Latch. From blocks 62 and 64 the logic descends into functional block 66. In functional block 66 the logic writes the data into the DRAM array and exits the routine.

FIGS. 6A-6D show timing diagrams for different types of memory cycles. These timings are implemented by the control and timing logic means 36 (FIG. 4). In each of these diagrams the signals which are generated are identified by names on the left-hand side of the graph and the graphical representation shows when the signals are active or inactive. The below table gives a listing of the abbreviation used in the drawings, the full name for the abbreviation and the function which the signal performs. "Data Out" represents the data which is read out of memory. This is not an abbreviation and therefore not included in the Table.

TABLE I

| Abbreviations | Full Name | Function |
|---|---|---|
| Valid & Comp. | Composite Signal | Logical and of "both inputs to Comparator are =" and "Valid Latch Set" |
| RAS | Row Address Strobe | Indicates RAM address signal and contains row address. |
| CAS | Column Address Strobe | Indicates RAM address signal and contains Column Address |
| SRAM Load | Static Random Access Memory Load | Causes SRAM to be loaded with output of sense logic |
| SRAM Select | Static Random Access Memory Load | Causes bypass MUX to select SRAM output vs sense output |
| RAM Address | Random Access Memory Address | Contains either row or column address or neither depending on RAS/CAS signal. It is used to select specific data from memory. |

Figure 6A:
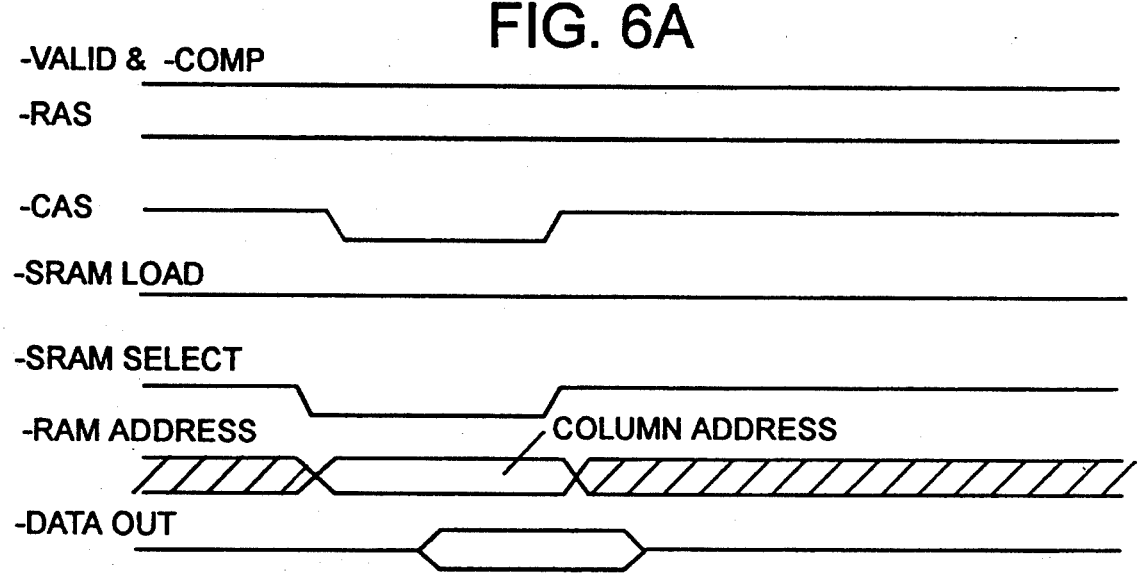
FIG. 6A is a timing diagram of the signals which are generated for an Instruction Fetch or date read from the SRAM buffer.

FIG. 6A shows the timing when the access that is done is either an Instruction Fetch or Data Read and the desired data or Instruction is already contained in the static RAM Buffer. Data in the SRAM Buffer (FIG. 4) is indicated if the Row Latch (FIG. 4) contains an address that matches an address on the Row Address Bus (FIG. 4) and the Valid Bit of the Valid Latch is set. To access the SRAM the Valid and the Compare Signal, the RAS signal and the SRAM load signals are not asserted. The CAS signal, the SRAM Select signal and the Column Address portion of the RAM address are asserted. Since the DRAM arrays of the DC DRAM memory sub-system is idle for this cycle, this would be an excellent opportunity for hidden refresh cycle to be performed on the dynamic RAMs. Such an approach would help to improve the access time of the memory system.

Figure 6B:
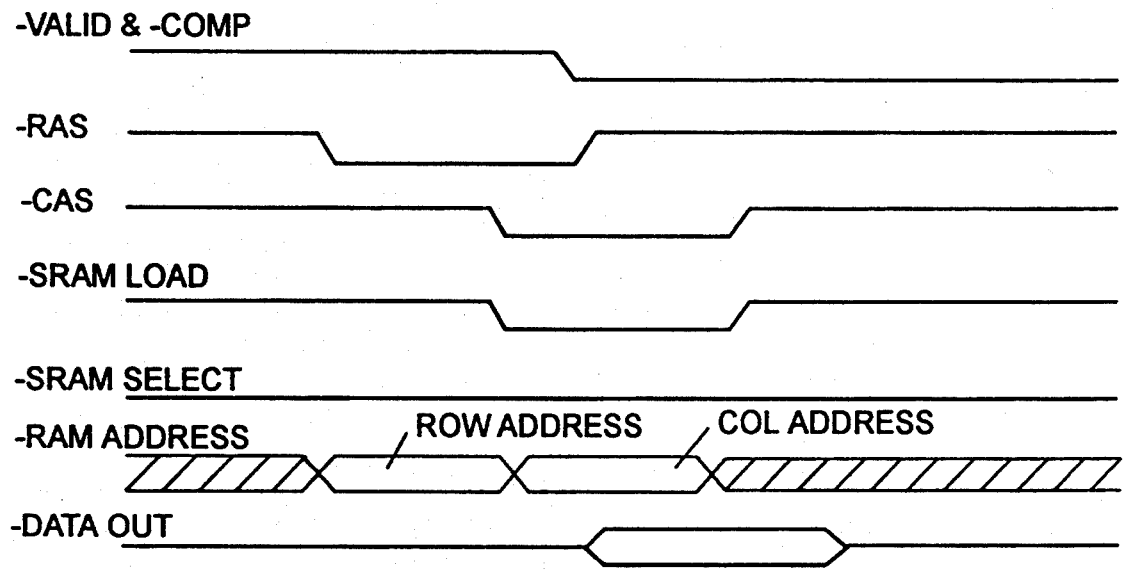
FIG. 6B is a timing diagram of the signals which are generated for a data read from the DRAM array. The retrieved data may be an instruction.

FIG. 6B shows a memory cycle for a Fetch from the DRAM array. When an Instruction Fetch is performed from a storage address that is not contained in the SRAM, a full RAS/CAS DRAM cycle must be performed. The same full memory cycle would be performed even if the information was not an instruction, albeit not present in the SRAM buffer. As is seen in FIG. 6B, the SRAM Select signal is not activated. The SRAM Load signal is asserted during the CAS portion of the cycle in order to cause the contents of the row being accessed to be transferred to the Static RAM Buffer. In addition, the current row address is stored in the Row Latch of the controller and the Valid Bit in the Valid Latch is set to indicate that the row latch contents are valid.

Figure 6C:
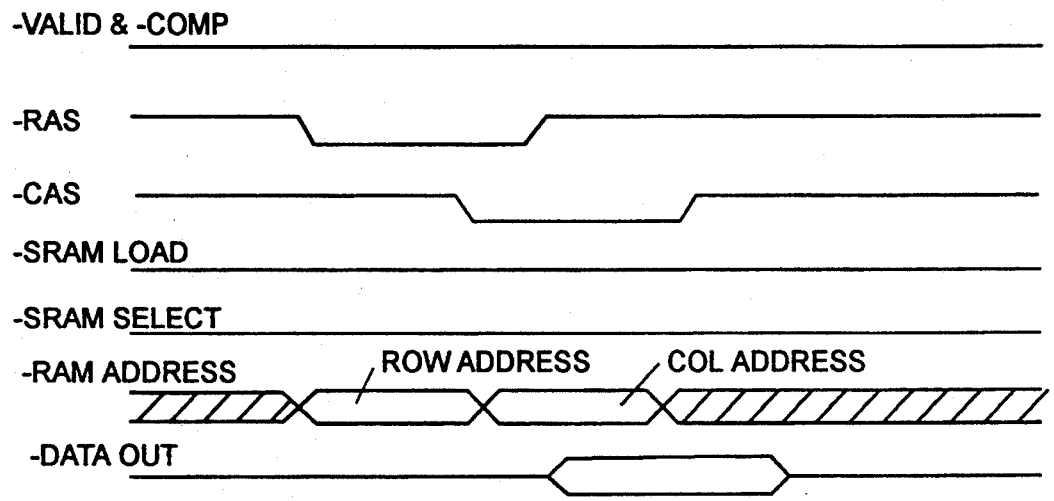
FIG. 6C is a timing diagram of the signals for a read from the DRAM array.

FIG. 6C shows a memory cycle for a read from the DRAM arrays. With the read three signals are inactive, namely: the Valid and Compare signals, the SRAM Load signal and the SRAM Select signal. The RAS signal, CAS signal, RAM address signals and Data Out signals are all active. If the data read is performed from a storage address not contained in the SRAM, then a full RAS/CAS DRAM cycle is done. This cycle differs from the Instruction Fetch from DRAM in that the SRAM buffer row latch and valid bit are unaffected by this cycle.

Figure 6D:
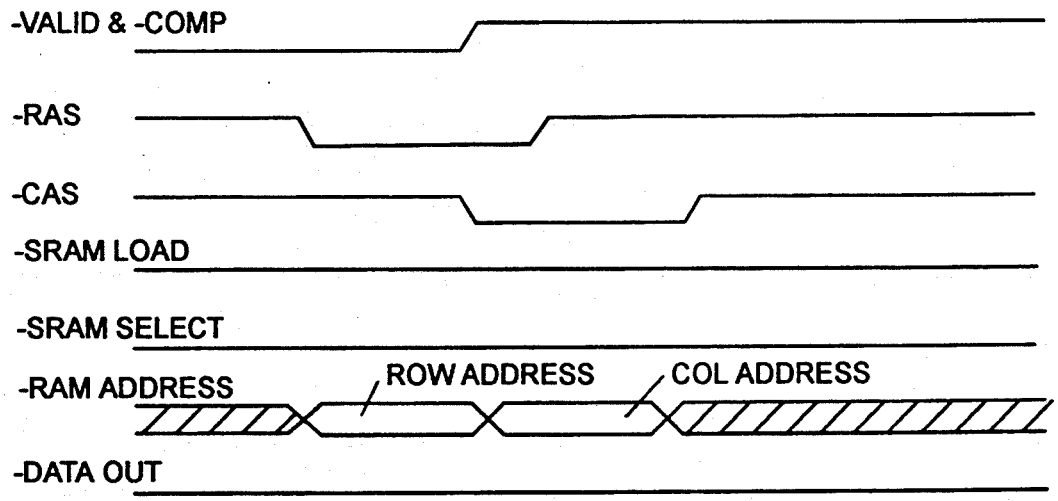
FIG. 6D is a timing diagram for a write cycle to an address in the SRAM.

FIG. 6D shows a memory cycle for a write data address in the SRAM. For this cycle the SRAM load signal, the SRAM select signal and the Data Out signal are inactive. A full RAS/CAS DRAM cycle is performed. If the storage address overlaps the region of storage contained in the SRAM Buffer, the Valid Bit in the controller is cleared during the CAS portion of the cycle. Otherwise, the Valid Bit is left unaffected.

OPERATION

In operation, the CPU 10 (FIG. 1) issues, on the system bus, the memory address which is to be accessed and a memory select signal. It also issues a read command or write command or Instruction Fetch command. The information on the system bus is received by the DC DRAM controller. The controller uses the memory select signal and address to determine which one of arrays 18 (FIG. 1) to access. The controller subsets the memory address into a row address and column address.

If the command is an Instruction Fetch or Data Read, the Row portion of the Address is compared with the contents of Row Latch 40 (FIG. 4). If a match occurs, and the Valid Bit in the Valid Latch 38 (FIG. 4) is on (i.e., set), the data to be fetched is already in the SRAM. The RAS portion of the cycle is omitted and the SRAM select signal (FIG. 3) is asserted to access the SRAM rather than the sense logic means. Simultaneously, the refresh cycle for the DRAMs is initiated.

If the Row Address does not match the Row Latch address, a full RAS/CAS DRAM cycle is performed (FIG. 6B). The SRAM Load signal (FIG. 3) is asserted during the CAS portion of the cycle in order to cause the contents of the row being accessed to be transferred to the static RAM buffer. In addition, the current row address is stored in the Row Latch of the controller and the Valid Bit is set in the Valid Latch to indicate that the Row Latch contents are Valid. If a Data Read is performed from a storage address not contained in the SRAM, then a full RAS/CAS DRAM cycle is performed. This cycle (FIG. 6C) differs from the Instruction Fetched from DRAM in that the SRAM Buffer, row latch and valid bit are unaffected by this cycle.

If the CPU had issued a Write command, a full RAS/CAS DRAM cycle is performed. If the storage address overlaps the region of storage contained in the SRAM buffer, the Valid Bit in the controller is cleared during the CAS portion of the cycle (FIG. 6B). Otherwise, the Valid Bit is left unaffected. It should be noted that writing the DRAM is accomplished in the conventional manner. Similarly, refresh of the DRAM is accomplished in a conventional manner.

While the invention has been particularly shown and described with reference to a preferred embodiment thereof, it will be understood by those skilled in the art that various changes in form and details may be made therein without departing from the spirit and scope of the invention.

We claim:

1. A memory sub-system for using with a processor comprising:

a dynamic memory array means for storing data;

a sense logic means connected to the dynamic memory array means; said sense logic means operable for receiving data which is outputted by said dynamic memory array means;

a static memory array means for storing at least a row of data from said dynamic memory array means;

a first multiplexer means for transmitting data to an external source from the dynamic memory array means and the static memory array means;

a first bus interconnecting the sense logic means, the static memory array means and the first multiplexor means;

a second bus interconnecting the static memory array means and the first multiplexor means; and a controller means coupled to the processor, the dynamic memory array means, the first multiplexor and the static memory array means; said controller means including a circuit means responsive to address signals and a command signal which are generated by the processor to generate Row Address signals for accessing a row in said dynamic memory array means and Column Address signals for accessing a bit in said row;

a Row Latch for storing a second set of signals representative of a Row Address for data which is in the static memory array means;

a comparator means having an input to receive the second set of signals which is stored in said Row Latch means and the Row address signals and to generate an SRAM Command Select signal if the Row address signals and the second set of signals match;

a control and timing logic means coupled to an input of the Row Latch and an output of the comparator means; said control and timing logic means receiving the SRAM command select signal and signals from the processor and generating a validity signal which is available at a first output when valid data is in the static memory array means and other control signals which enable the Row Latch, the circuit means and the second static memory array means said other control signals including a first control signal which causes data to be transferred from the sense logic means into the static memory array means if said first control signal is set to a first state and block transfer of data into the static memory array means if said first control signal is set to a second state and a second control signal which causes the first multiplexor means to select the static memory array means as a source for output data which is transmitted on the second bus if the second control signal is set to a first state or the sense logic means as a source for output data which is transmitted on the first bus if said second control signal is set to a second state; and a Valid Latch means connected to the first output; said Valid latch means responsive to be set in a first state by the Validity Signal.

* * * * *